Dec. 31, 1957     E. A. ZUZELO     2,818,058
TILTING SAW CLAMP

Filed Aug. 14, 1957                      2 Sheets-Sheet 1

INVENTOR.
EDWARD A. ZUZELO
BY John D. Myers
ATTORNEY.

Dec. 31, 1957  E. A. ZUZELO  2,818,058
TILTING SAW CLAMP
Filed Aug. 14, 1957  2 Sheets-Sheet 2
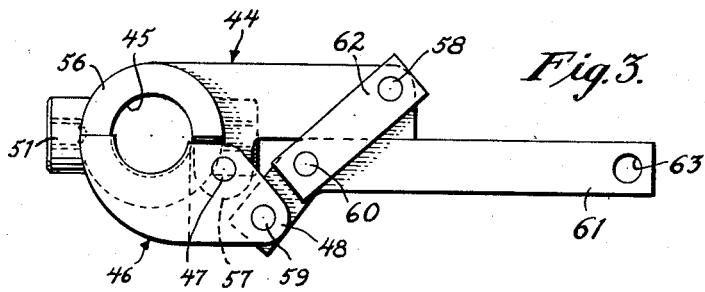
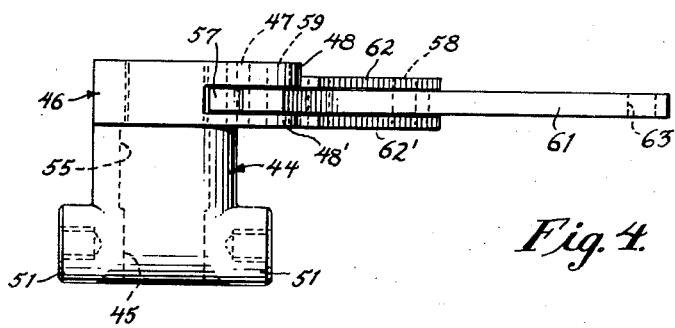
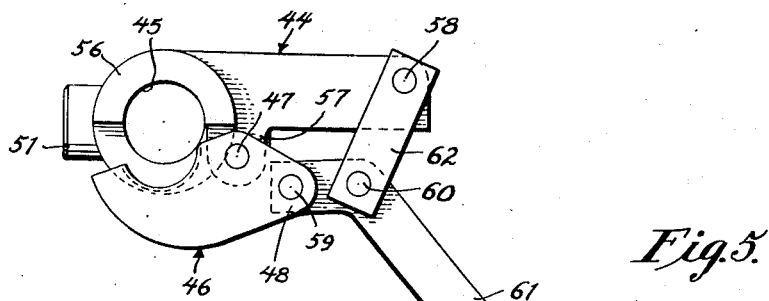
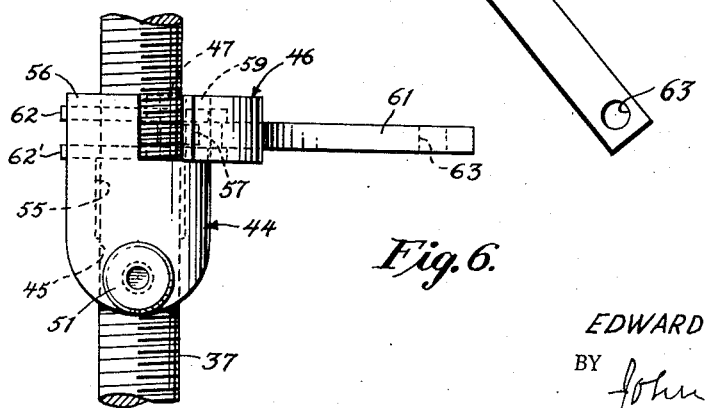
INVENTOR.
EDWARD A. ZUZELO
BY John D. Myers
ATTORNEY.

United States Patent Office 2,818,058
Patented Dec. 31, 1957

2,818,058
TILTING SAW CLAMP
Edward A. Zuzelo, Narberth, Pa.
Application August 14, 1957, Serial No. 678,102
8 Claims. (Cl. 125—13)

This invention relates to clamping means useful in apparatus having linkage adjustable for length, such as masonary-cutting apparatus having a tilting saw platform.

In a well-known type of apparatus for sawing brick, tile, or the like, the saw blade is mounted on a tilting platform located above the work. Fine adjustment in the height of the blade is accomplished by raising or lowering a foot-actuated lever linked to tilt the platform, and the platform also is adapted to be raised or lowered bodily to accommodate gross changes in the size of the material to be cut. Inasmuch as a change in the height of the platform pivot changes the angle of tilt, at least in the absence of means to effect corresponding change in the effective length of the tilting linkage, rapid but close adjustment of the linkage length is highly desirable. Continuous screw-adjustment of the linkage is fine enough but undesirably slow; continuous sliding adjustment is sufficiently rapid but frequently presents clamping difficulties; and discontinuous adjustment to widely spaced linkage intervals may provide insufficient tilting range at a particular setting of platform height.

A primary object of the present invention is ready adjustment of the effective length of linkage between the tilt-actuating lever and the tilting platform of a masonry saw so as to accommodate changes in height of the platform pivot without sacrifice of the range through which the platform can tilt at any height or of fine adjustment within that range. A particular object is provision of a positive, quick-acting coupling device for such linkage. Other objects of this invention, together with means and methods for attaining the various objects, will be apparent from the following description and the accompanying diagrams.

Figure 1:
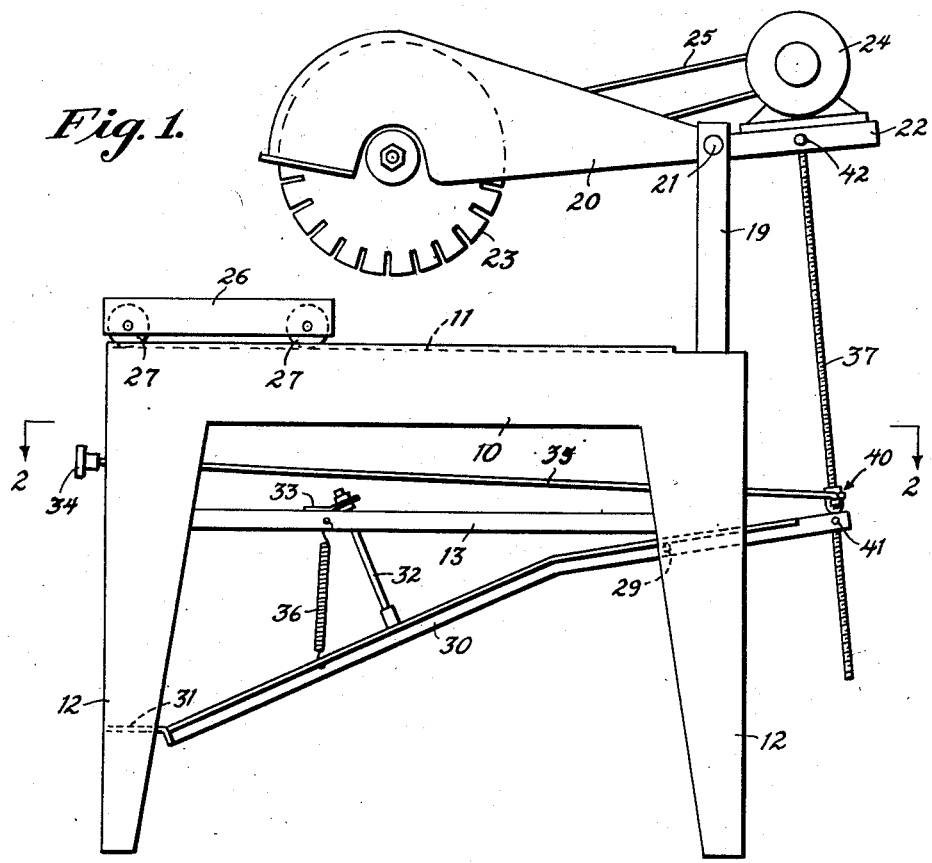
Figure 2:
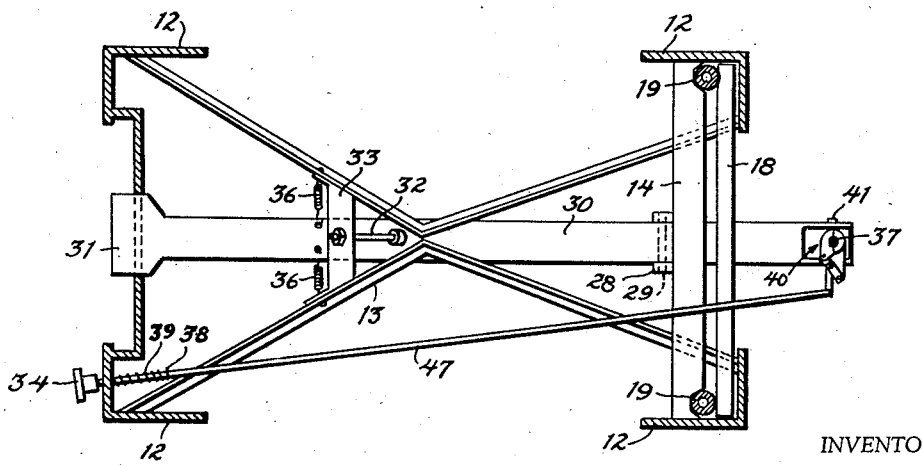

Fig. 1 is a side elevation of a masonry saw incorporating the present invention, and Fig. 2 is a sectional plan of the same apparatus taken at 2—2 of Fig. 1. Fig. 3 is a plan of a coupling device of this invention, as employed on the apparatus of the preceding views, in closed or clamped position; Fig. 4 is a front elevation corresponding to Fig. 3; Fig. 5 is a plan of the same device in open or unclamped position; and Fig. 6 is an end elevation of the device open or unclamped, as in Fig. 5, but with a threaded member in position to be clamped thereby.

Fig. 1 shows in elevation from the right side (of an operator facing the apparatus) a generally known design of saw apparatus modified by embodiment of the present invention. Table 10 is supported at the corners by flanged legs 12, only two of which are visible in this view but all four of which appear in Fig. 2, which shows the same apparatus sectioned along the underside of the table as indicated by line 2—2 of Fig. 1. The sectional view also reveals the generally X-shaped cross brace 13 affixed to the legs for increased rigidity. The table supports on recessed track 11, wheels 27 of work carrier 26, which is movable accordingly to and fro underneath cutting blade 23 supported within housing 20 attached to and extending from platform 22.

The platform is mounted pivotally on pin 21 in the top of support 19 which comprises a pair of vertical posts spaced horizontally from one another and secured frictionally between guide 14 affixed to the flanged legs and bar 18 retained between the rear corners of the legs and adjustable by suitable means (not shown) to vary the pressure of contact with the posts. Affixed to the guide midway of the lower edge is bracket 28 bearing pivot pin 29 about which tilt-controlling lever 30 is pivotable in a vertical plane. Lever 30 has at its front end (left side of the views) pedal plate 31 depressible by the foot of the operator. Springs 36 connected to both the lever and the cross brace normally urge this end of the lever upward against the depending end of stop 32 held at its threaded upper end by bracket 33 affixed to the cross brace. The far end of the lever is bifurcated to accommodate the base of coupling assembly 40, which is retained in it by pair of pins 41.

Threaded rod 37 passing through the coupling assembly is retained pivotally at its upper end by pin 42 held in the rear of the platform underneath motor 24, which drives the saw blade via belt 25. Throw rod 35 extending from in front of to behind the table is cottered at its downturned far end to the coupling assembly; at the front, the rod passes through an aperture in the right front leg of the table and terminates in knob 34. Washer 38 affixed to the rod holds bias spring 39 compressed between it and the inside edge of the leg.

Details of the coupling assembly itself, which is the particular subject of the present invention, appear in the subsequent views: Fig. 3 showing it in plan in the closed position of the preceding views (but with the threaded rod removed), Fig. 4 showing it in side elevation, also closed and omitting the threaded rod, Fig. 5 showing it in plan, but open, and Fig. 6 showing it in end (left) elevation, also open but with the threaded rod in place.

The coupling assembly comprises two main parts: coupling member 44, which has substantially vertical bore 45 to accommodate the threaded rod, and relatively movable clamping member or jaw 46 pivotally held by vertical pin 47 retained in lug 57 of the coupling.

The lower portion of the coupling member is generally cylindrical, but two horizontal internally threaded bosses 51 extend from side to side at the bottom to receive the pivot pins (41) extending through the bifurcated end of the foot lever. The cylindrical bore of the coupling itself is enlarged above the level of the bosses by relief space 55, above which extends semi-cylindrical portion 56 of the coupling located with its concave edge in alignment with the rear half of the bore. Lug 57 extends forward midway of the right edge of semi-cylindrical portion 56. Further to the right, an extension of the coupling carries pin 58 for linkage to be described later.

The clamping jaw, which is generally semi-cylindrical in plan, but with an apex at the front right, is bifurcated at its right side into upper and lower ears 48 and 48' to admit the lug of the coupling. Supported pivotally by the pin through the lug the jaw is shown first in the closed position, with its threaded semi-cylindrical face opposite the unthreaded semi-cylindrical portion of the coupling, the cylindrical space formed therebetween being aligned with the bore of the coupling. The base of the threads has the same radius as the bore, so in this closed or clamped position the threads intrude beyond alignment with the inner wall of the bore.

The apex of the jaw carries pin 59 for the linkage to be discussed later. The apex shape permits the jaw to pivot (about pin 47) relative to the coupling to the open or unclamped position shown in Figs. 5 and 6, in which the threads of the clamping jaw no longer obstruct the cylindrical bore of the coupling.

Fig. 6 shows the open or unclamped coupling assembly with threaded rod 37 of only slightly smaller diameter than bore 45 extending entirely therethrough. Tapped boss 51 on the left side of the coupling member appears end-on in this view. The threaded inner face of the jaw (not visible) is withdrawn from contact with the rod, exposing part of the rod's threaded surface (contacted by the jaw when in the clamped position); a portion of the mounting lug for the jaw is indicated in broken lines.

Movement of the clamping jaw between the open and closed positions is accomplished by means of a toggle-like linkage, whose construction and action are evident from a comparison of Figs. 3 and 5, representing in plan the closed and open positions, respectively. Horizontal lever 61 has a long straight section and a coplanar short straight section joining it at an obtuse angle in a "dog-leg" configuration. Each end and the dogleg junction of this lever have an aperture to receive a pivot pin. Aperture 63 at the free end of the long section receives the downturned end of the throw rod, itself shown in Fig. 1. The short section is retained pivotally at its end by pin 59 extending through the aperture in it and terminating in the upper and lower ears (48 and 48') of the jaw. Pin 60 pivotally ties the apertured dogleg junction of the two sections to upper and lower links 62 and 62'; the other ends of these two links straddle the extension of the coupling, to which they are secured pivotally by pin 58.

Forward movement of the free end of lever 61, as at the instance of the throw rod, changes the orientation of that lever, links 62 and 62', and the jaw itself (relative to the coupling), as shown in Fig. 5. In the open position the short or dogleg section of the lever is substantially parallel to the front edge of the extension of the coupling, while the link joining the lever to the coupling is rotated accordingly.

The center of pin 60 located at the dogleg of lever 61 is not in line with the centers of pins 58 and 59 in either the open or closed position, but passes between them as the jaw opens and closes. Such toggle linkage is recognizedly unstable in the partly open position, that conforms to alignment of all three pins. As is apparent from Fig. 2, bias spring 39 acting upon the throw rod urges the clamping member to the closed position.

The operation of this apparatus is readily understood. It is clear that relative sliding movement of the coupling with respect to the rod is permissible only when the threads of the jaw do not engage those of the rod. Of course, in the closed position, the jaw and the rod are fixed relative to one another by engagement of their threads.

For any setting of platform height, the tilt of the platform is controlled by the position of the operator's foot on the controlling lever connected by the coupling assembly to the threaded rod attached to the rear of the platform. Depression of the pedal actuates the linkage to lower the saw blade by virtue of the fixed location of the coupling and consequent constant effective length of the linkage. It is noteworthy that as the pedal is depressed to raise the threaded tilting rod, the rod also moves forward somewhat (as the coupling rises through an arc in a vertical plane) to increase compression of the clamping spring on the throw rod. Thus, as the operator tilts the saw, the grip of the jaw on the tilting rod tightens, effectively precluding the possibility of slippage.

Whenever the operator wants to change the tilt of the platform in its rest position to move the saw blade closer to the work on the carrier or to raise it to accommodate a larger uncut piece, he need only pull the knob of the throw rod forward, thereby unclamping the jaw of the coupling assembly, and lower or raise the saw housing manually. The threaded rod will slide smoothly through the unclamped coupling assembly, and the jaw will close positively to the clamped position as the operator releases the knob upon attaining the desired saw position. When a greater change in the size of the work requires a bodily lifting or lowering of the saw platform, the original tilt can be re-established simply (or any other tilt within the permitted range be secured) in like manner.

The claimed invention:

1. In saw apparatus having a tilting saw platform and a controlling lever therefor spaced therefrom, the improvement comprising a threaded tilting rod attached to the platform and a coupling assembly attached to the actuating lever, the coupling assembly including a coupling member having a cylindrical bore therethrough adapted to fit slidably about the threaded rod, and a clamping member supported pivotally on the coupling member and having an internally threaded, substantially semi-cylindrical surface adapted to mate with the side of the threaded rod, whereby movement of the controlling lever is transmissible to tilt the saw platform.

2. The apparatus of claim 1, including toggle means interconnecting the clamping and coupling members and adapted to move the clamping member into and out of mating contact with the side of the threaded rod.

3. The apparatus of claim 2, in which the toggle means comprises a first link pivotally pinned at one end to the clamping member, a second link pivotally pinned at one end to the coupling member, and an intermediate pin pivotally joining the two links.

4. The apparatus of claim 3, in which one of the links has a dogleg configuration with an aperture at the change in angle thereof to accommodate the intermediate pin.

5. The apparatus of claim 2, including a longitudinally movable throw rod joined to the toggle means and adapted to move it between the clamped and unclamped positions plus cooperating means adapted to bias the coupling assembly to the clamped position.

6. The apparatus of claim 5, in which the cooperating means comprises a compression spring surrounding a portion of the throw rod, first retaining means affixed to the throw rod at the end of the compression spring nearer the coupling assembly, and second retaining means at the opposite end of the spring and adapted to hold that end fixed in location despite movement of the throw rod in the compressing direction.

7. Clamping means comprising a fixed member having a cylindrical bore therethrough and a movable member pivotally mounted on the fixed member for movement within a limited arc about an axis parallel to the axis of the bore and having an internally threaded substantially semi-cylindrical surface of maximum radius approximating the radius of the bore and adapted to be aligned therewith upon pivoting of the movable member to one end of the arc.

8. The device of claim 7, in which an extending semi-cylindrical wall portion of the fixed member is aligned with one side of the bore through that member, and the semi-cylindrical surface of the movable member is adapted to be opposed thereto, the opposing semi-cylindrical surfaces defining an intervening cylindrical region substantially aligned with the bore.

No references cited.